US012695120B2

(12) United States Patent
Qian et al.

(10) Patent No.: US 12,695,120 B2
(45) Date of Patent: Jul. 28, 2026

(54) LITHIUM-ION BATTERY

(71) Applicant: SHENZHEN CAPCHEM TECHNOLOGY CO., LTD., Shenzhen (CN)

(72) Inventors: Yunxian Qian, Shenzhen (CN); Shiguang Hu, Shenzhen (CN); Guiyan Sun, Shenzhen (CN); Xionggui Lin, Shenzhen (CN); Yonghong Deng, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 530 days.

(21) Appl. No.: 18/269,755

(22) PCT Filed: Dec. 16, 2021

(86) PCT No.: PCT/CN2021/138672

§ 371 (c)(1),
(2) Date: Jun. 27, 2023

(87) PCT Pub. No.: WO2022/143188

PCT Pub. Date: Jul. 7, 2022

(65) Prior Publication Data

US 2024/0097187 A1 Mar. 21, 2024

(30) Foreign Application Priority Data

Dec. 31, 2020 (CN) ........................ 202011641707.2

(51) Int. Cl.

| | |
|---|---|
| ***H01M 10/0567*** | (2010.01) |
| ***H01M 4/525*** | (2010.01) |
| ***H01M 4/62*** | (2006.01) |
| ***H01M 10/0568*** | (2010.01) |
| ***H01M 10/0569*** | (2010.01) |
| *H01M 4/02* | (2006.01) |
| *H01M 10/0525* | (2010.01) |

(52) U.S. Cl.

CPC ....... *H01M 10/0567* (2013.01); *H01M 4/525* (2013.01); *H01M 4/623* (2013.01); *H01M 10/0568* (2013.01); *H01M 10/0569* (2013.01); *H01M 2004/028* (2013.01); *H01M 10/0525* (2013.01)

(58) Field of Classification Search

CPC .. H01M 4/525; H01M 4/623; H01M 10/0525; H01M 10/0567; H01M 10/0568; H01M 10/0569; H01M 2004/028

USPC .......................................................... 429/188

See application file for complete search history.

(56) References Cited

U.S. PATENT DOCUMENTS

| | | | | |
|---|---|---|---|---|
| 10,559,850 B2 * | 2/2020 | Dubois | H01M 10/0525 | |
| 10,886,564 B2 * | 1/2021 | Koh | H01M 4/485 | |
| 10,950,857 B2 * | 3/2021 | Pullen | C01G 53/42 | |
| 10,971,757 B2 * | 4/2021 | Liu | H01M 10/0567 | |
| 11,637,322 B2 * | 4/2023 | Son | H01M 10/0567 | 429/188 |
| 2002/0071991 A1 * | 6/2002 | Kweon | H01M 4/131 | 427/126.3 |
| 2013/0330636 A1 * | 12/2013 | Deguchi | H01M 10/0567 | 429/338 |
| 2015/0280282 A1 * | 10/2015 | Nishie | H01M 10/0567 | 429/188 |
| 2017/0084951 A1 | 3/2017 | Dubois et al. | | |
| 2019/0355983 A1 * | 11/2019 | Zhang | H01M 4/485 | |
| 2019/0356015 A1 * | 11/2019 | Zhang | H01M 10/0418 | |
| 2021/0066743 A1 * | 3/2021 | Do | H01M 10/0525 | |
| 2021/0135291 A1 * | 5/2021 | Kim | H01M 10/0569 | |

FOREIGN PATENT DOCUMENTS

| | | |
|---|---|---|
| CN | 104718658 A | 6/2015 |
| CN | 105655642 A | 6/2016 |
| CN | 106058316 A | 10/2016 |
| CN | 108933294 A | 12/2018 |
| CN | 110504415 A | 11/2019 |
| JP | 2015176760 A | 10/2015 |
| KR | 20200033201 A | 3/2020 |
| WO | 2019211366 A1 | 11/2019 |

OTHER PUBLICATIONS

International Search Report of PCT Patent Application No. PCT/CN2021/138672 issued on Feb. 25, 2022.

Extended European Search Report of European Patent Application No. 21913929.2 issued on Feb. 27, 2025.

* cited by examiner

*Primary Examiner* — Brian K Talbot

(57) ABSTRACT

The existing positive electrode material that is doped or coated with compound has the problem OF ion dissolution and battery performance deterioration at high temperature. To solve it, the invention provides a lithium-ion battery, comprising a positive electrode, a negative electrode and a non-aqueous electrolyte, wherein the positive electrode comprises a positive electrode material layer, the positive electrode material layer comprises a positive electrode active material, and the positive electrode active material comprises $LiMO_2$, where M is selected from one or more of Ni, Co and Mn, and the positive electrode active material is doped with a compound containing metal element A and/or coated with a compound containing metal element A, the non-aqueous electrolyte comprises a solvent, an electrolyte salt and a compound represented by Structural formula 1. The lithium-ion battery provided by the invention could effectively improve the overall stability of the material.

14 Claims, No Drawings

LITHIUM-ION BATTERY

TECHNICAL FIELD

The present application belongs to the technical field of secondary batteries, and particularly relates to a lithium-ion battery.

BACKGROUND

Lithium-ion batteries are widely used in 3C digital devices and new energy vehicles because of their high energy density, long cycle life, low self-discharge rate and environmental protection. With the constant development of modern technology and the continuous expansion of the application scope of lithium-ion batteries, people raise higher requirements for energy density of lithium-ion batteries.

Regarding the main factor limiting the capacity of lithium-ion batteries, in recent years, people have been continuously trying to improve positive electrode materials through technology to improve the cutoff voltage and applicable temperature range of lithium-ion batteries, such as crystal doping and surface coating. However, doping and surface coating might affect the movement stability of lithium-ions between electrolyte and electrode materials to a certain extent, and then affect the electrochemical performance of the battery. At the same time, the transition metal elements of the positive electrode material and the metal elements used for doping or surface coating are likely to dissolve from the electrolyte at high temperature and migrate to the surface of the negative electrode material, which would not only destroy the negative electrode SEI film, but also hinder the removal of lithium embedded in the negative electrode material and produce lithium dendrites, which would directly deteriorate the electrochemical performance of the battery such as high-temperature storage and high-temperature cycle.

SUMMARY

The existing doped or surface-coated positive electrode material has the problem of ion dissolution at high temperature, which deteriorates the battery performance. In view of this, the present application provides a lithium-ion battery.

The technical solutions adopted by the application to solve the technical problems are as follows:

The embodiments of the present application provide lithium-ion battery, including a positive electrode, a negative electrode and a non-aqueous electrolyte, wherein the positive electrode includes a positive electrode material layer, the positive electrode material layer includes a positive electrode active material, and the positive electrode active material includes $LiMO_2$, where M is selected from one or more of Ni, Co and Mn, and the positive electrode active material is doped with a compound containing metal element A and/or coated with a compound containing metal element A, the metal element A is selected from one or More of Al, Mg, Cr, Pb, Ti, Ba, Cu, Fe, Sr, Y, Zr, Zn, Cd, Ru, V, Mo, Ta, W, Nb and Sn;

the non-aqueous electrolyte includes a solvent, an electrolyte salt and a compound represented by Structural formula 1:

Structural formula 1

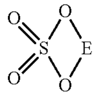

wherein E is selected from

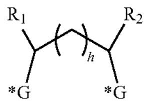

or

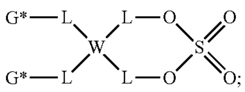

Structural formula 2

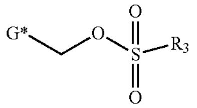

Structural formula 3

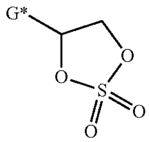

Structural formula 4

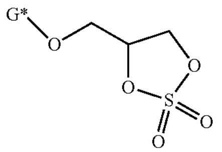

where G* represents a bonding position;

h is 0 or 1;

$R_1$ and $R_2$ are each independently selected from a hydrogen atom, an alkyl group with 1-6 carbon atoms, a group represented by Structural formula 2 or a group represented by Structural formula 3;

$R_3$ is selected from an alkyl group with 1-6 carbon atoms, a haloalkyl group with 1-6 carbon atoms, an alkoxy group with 1-6 carbon atoms, a halogen atom or a group represented by Structural formula 4;

L is selected from a single bond or methylene, and W is selected from

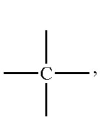,

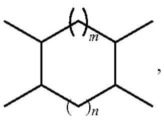,

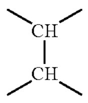

and

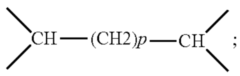;

where m is an integer from 1 to 4, n is an integer from 0 to 2, and p is an integer from 0 to 6;

based on the total mass of the non-aqueous electrolyte being 100%, a percentage mass content of the compound represented by Structural formula 1 is B %; a ratio of a molar content of metal element A to a molar content of transition metal M in the positive electrode material layer per unit area is C, and F=B/C, which satisfies the following relationship:

$$0.25 \le F \le 500.$$

Optionally, the value F satisfies the following relationship:

$$1 \le F \le 200;$$

preferably, $5 \le F \le 80$.

Optionally, the positive electrode active material is selected from $LiNi_xCo_yMn_zA_{(1-x-y-z)}O_2$, wherein A is selected from one or more of Al, Mg, Cr, Pb, Ti, Ba, Cu, Fe, Sr, Y, Zr, Zn, Cd, Ru, V, Mo, Ta, W, Nb and Sn, $0 \le x \le 1$, $0 \le y \le 1$, $0 \le z \le 1$, $0x+y+z<1$, and x, y and z are not 0 at the same time.

Optionally, a coating layer is provided outside the positive electrode active material, and the coating layer is selected from an oxide containing metal element A, and a weight of the coating layer is 1-10% of the total weight of the positive electrode active material.

Optionally, the oxide containing metal element A includes one or more of aluminium oxide, magnesium oxide, titanium oxide, tungsten oxide, tin oxide, zinc oxide, zirconium oxide, molybdenum oxide and chromium oxide;

preferably, a lattice energy of the oxide containing metal element A is less than 4000 Kj/mol.

Optionally, the compound represented by Structural formula 1 is selected from one or more of the following compounds:

Compound 1

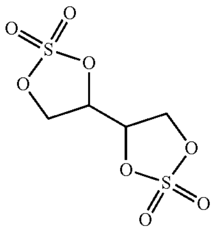

Compound 2

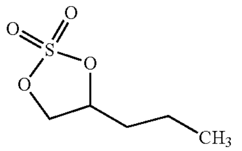

Compound 3

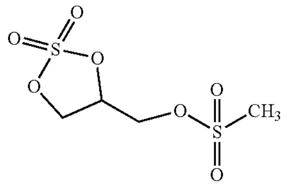

Compound 4

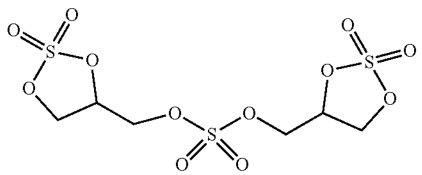

-continued

Compound 5

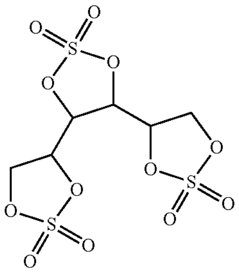

Compound 6

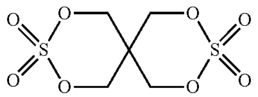

Compound 7

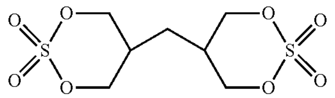

Compound 8

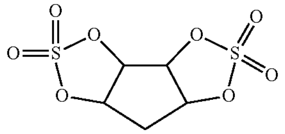

Compound 9

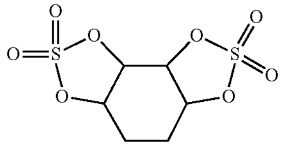

Compound 10

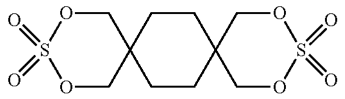

Compound 11

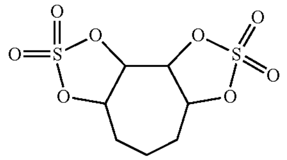

Compound 12

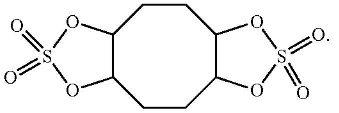

Optionally, the percentage mass content of the compound represented by Structural formula 1 is 0.05%-5%, preferably 0.1-3% based on the total mass of the non-aqueous electrolyte being 100%;

a range of C is 0.01-0.2, preferably 0.01-0.1.

Optionally, the positive electrode material layer further includes a positive electrode binder, and the positive electrode binder includes polyvinylidene fluoride.

Optionally, the solvent includes one or more of cyclic carbonate, linear carbonate, carboxylic ester and ether.

preferably, the electrolyte salt includes one or more of $LiPF_6$, $LiBF_4$, $LiPO_2F_2$, LiBOB, LiDFOB, $LiSbF_6$, $LiAsF_6$, $LiN(SO_2CF_3)_2$, $LiC(SO_2CF_3)_3$ and $LiN(SO_2F)_2$;

a content of the electrolyte salt is 0.5-3.5 mol/L in the non-aqueous electrolyte.

Optionally, the non-aqueous electrolyte further includes a supplemental additive, and the supplemental additive includes one or more of unsaturated cyclic carbonate, fluorinated cyclic carbonate, cyclic sultone and cyclic sulfate;

the percentage mass content of the supplemental additive is 0.1%-5% based on the total mass of the non-aqueous electrolyte being 100%;

preferably, the fluorinated cyclic carbonate is selected from one or more of fluoroethylene carbonate, trifluoromethyl vinylethylene carbonate and bisfluoroethylene carbonate;

the cyclic sultone is selected from one or more of 1,3-propane sultone, 1,4-butane sultone and propenyl-1,3-sultone; and the cyclic sulfate is selected from one or more of ethylene sulfate and 4-methyl ethylene sulfate.

According to the lithium-ion battery provided by the invention, a positive electrode active material with transition metal M is adopted, and meanwhile, the positive electrode active material is doped with a compound containing metal element A and/or coated with a compound containing metal element A. According to the inventor's experiments, after cyclic sulfate with a specific structure (a compound represented by Structural formula 1) is added into a non-aqueous electrolyte, the cyclic sulfate can complex the cation of doped or coated metal element A in a certain proportion under the catalysis of transition metal M, so as to generate an interface film layer complexed with the cation of doped or coated metal element A on the surface of the positive electrode material layer, further stabilize the positive electrode active material, prevent the cell of the positive electrode active material from changing in the direction of axis c/a, prevent the crystal structure from collapsing, and improve the overall stability of the material, thereby improving the electrochemical performance of the battery at high temperature.

Specifically, the proportional relationship among the compound represented by Structural formula 1, transition metal M and metal element A has a great influence on the stability of the interface film on the surface of the positive electrode material layer. When the ratio F satisfies the relationship of $0.25 \leq F \leq 500$, the interface film formed has high stability, but whether the ratio F is lower or higher than the above ratio range, it is not conducive to the improvement of the stability of the interface film. Especially, if the value F is too small, it is difficult to form a complete interface film. If the value F is too large, it would lead to the increase of battery impedance.

DETAILED DESCRIPTION OF PREFERRED EMBODIMENTS

In order to make the to-be-solved technical problems, technical solutions and beneficial effects of the present application clearer, the present application will be described in further detail below with reference to embodiments. It should be understood that the specific embodiments described herein are only for the purpose of explaining the present application and are not intended to limit the present application.

The embodiments of the present application provide lithium-ion battery, including a positive electrode, a negative electrode and a non-aqueous electrolyte, wherein the positive electrode includes a positive electrode material layer, the positive electrode material layer includes a positive electrode active material, and the positive electrode active material includes $LiMO_2$, where M is selected from one or more of Ni, Co and Mn, and the positive electrode active material is doped with a compound containing metal element A and/or coated with a compound containing metal element A, the metal element A is selected from one or More of Al, Mg, Cr, Pb, Ti, Ba, Cu, Fe, Sr, Y, Zr, Zn, Cd, Ru, V, Mo, Ta, W, Nb and Sn;

the non-aqueous electrolyte includes a solvent, an electrolyte salt and a compound represented by Structural formula 1:

Structural formula 1

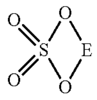

wherein E is selected from

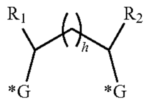

or

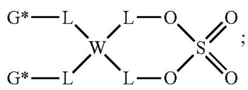

;

Structural formula 2

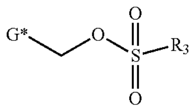

Structural formula 3

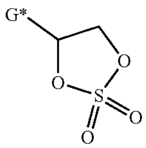

Structural formula 4

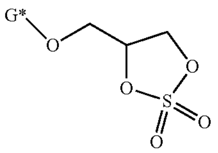

where G* represents a bonding position;

h is 0 or 1;

$R_1$ and $R_2$ are each independently selected from a hydrogen atom, an alkyl group with 1-6 carbon atoms, a group represented by Structural formula 2 or a group represented by Structural formula 3;

$R_3$ is selected from an alkyl group with 1-6 carbon atoms, a haloalkyl group with 1-6 carbon atoms, an alkoxy group with 1-6 carbon atoms, a halogen atom or a group represented by Structural formula 4;

L is selected from a single bond or methylene, and W is selected from

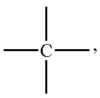

,

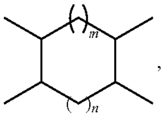

,

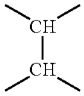

and

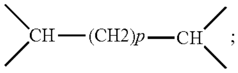

;

where m is an integer from 1 to 4, n is an integer from 0 to 2, and p is an integer from 0 to 6;

based on the total mass of the non-aqueous electrolyte being 100%, a percentage mass content of the compound represented by Structural formula 1 is B %; a ratio of a molar content of metal element A to a molar content of transition metal M in the positive electrode material layer per unit area is C, and F=B/C, which satisfies the following relationship:

$$0.25 \leq F \leq 500.$$

A transition metal M is adopted for the positive electrode active material, and meanwhile, the positive electrode active material is doped with a compound containing metal element A and/or coated with a compound containing metal element A. According to the inventor's experiments, after cyclic sulfate with a specific structure (a compound represented by Structural formula 1) is added into a non-aqueous electrolyte, the cyclic sulfate can complex the cation of doped or coated metal element A in a certain proportion under the catalysis of transition metal M, so as to generate an interface film layer complexed with the cation of doped or coated metal element A on the surface of the positive electrode material layer, further stabilize the positive electrode active material, prevent the cell of the positive electrode active material from changing in the direction of axis c/a, prevent the crystal structure from collapsing, and improve the overall stability of the material, thereby improving the electrochemical performance of the battery at high temperature.

Specifically, the proportional relationship among the compound represented by Structural formula 1, transition metal M and metal element A has a great influence on the stability of the interface film on the surface of the positive electrode material layer. When the ratio F satisfies the relationship of $0.25 \leq F \leq 500$, the interface film formed has high stability, but whether the ratio F is lower or higher than the above ratio range, it is not conducive to the improvement of the stability of the interface film. Especially, if the value F is too small, it is difficult to form a complete interface film. If the value F is too large, it would lead to the increase of battery impedance.

The percentage mass content of the compound represented by Structural formula 1 in the non-aqueous electrolyte can be quantitatively characterized by Gas Chromatography (GC) and Ion Chromatography (IC). The ratio of the molar content of metal element A to the molar content of transition metal M in the positive electrode material layer per unit area can be qualitatively and quantitatively determined by X-ray Photoelectron Spectroscopy (XPS) and inductively coupled plasma spectrometry (ICP).

In some embodiments, the compound represented by Structural formula 1 is selected from

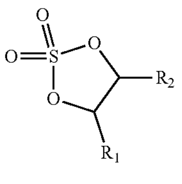 or 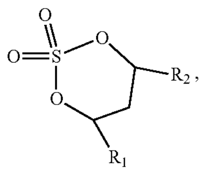, $R_1$ and $R_2$ are independently selected from a hydrogen atom, an alkyl group with 1-6 carbon atoms, a group represented by Structural formula 2 or a group represented by Structural formula 3;

$R_3$ is selected from an alkyl group with 1-6 carbon atoms, a haloalkyl group with 1-6 carbon atoms, an alkoxy group with 1-6 carbon atoms, a halogen atom or a group represented by Structural formula 4;

Structural formula 2

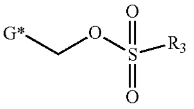

Structural formula 2

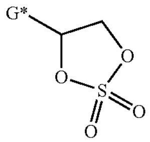

Structural formula 4

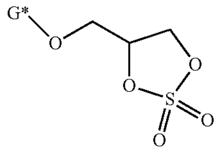

where G* represents a bonding position.

In some embodiments, the compound represented by Structural formula 1 is selected from

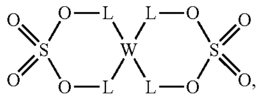

wherein L is selected from a single bond or methylene group, and W is selected from

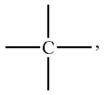, 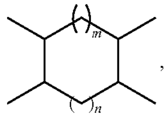, 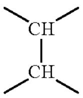 or

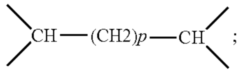 ;

where m is an integer from 1 to 4, n is an integer from 0 to 2, and p is an integer from 0 to 6.

Specifically, the compound represented by Structural formula 1 is selected from the following structural formulas:

Structural formula 5

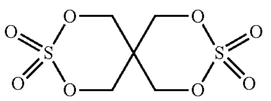

Structural formula 6

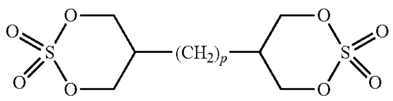

Structural formula 7

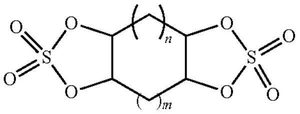

-continued

Structural formula 8

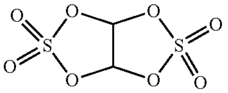

where m is an integer from 1 to 4, n is an integer from 0 to 2, and p is an integer from 0 to 6.

In a preferred embodiment, the value F satisfies the following relationship:

$$1 \leq F \leq 200.$$

In a more preferred embodiment, the value F satisfies the following relationship:

$$5 \leq F \leq 80.$$

In some embodiments, metal element A is added into the positive electrode active material by doping, and the doped metal element A can provide a stronger chemical bond A-O than active transition metals such as Ni, Co and Mn, thus inhibit the precipitation of lattice oxygen under high voltage, and improve the stability of the material structure. The interface film formed by complexing the compound represented by Structural formula 1 with the metal element A can inhibit the dissolution of the transition metal M and metal element A, and further improve the stability of the positive electrode active material.

In the embodiment of doping, the positive electrode active material is selected from $LiNi_xCo_yMn_zA_{(1-x-y-z)}O_2$, wherein A is selected from one or more of Al, Mg, Cr, Pb, Ti, Ba, Cu, Fe, Sr, Y, Zr, Zn, Cd, Ru, V, Mo, Ta, W, Nb and Sn, $0 \leq x \leq 1$, $0 \leq y \leq 1$, $0 \leq z \leq 1$, $0x+y+z<1$, and x, y and z are not 0 at the same time.

In some embodiments, the metal element A is added into the surface of the positive electrode active material by coating, and the compound containing metal element A coated on the surface can prevent the positive electrode active material from directly contacting the electrolyte and avoid the dissolution of transition metals. However, in the embodiment in which the compound containing metal element A is added by the manner of coating, the volume of the positive active material would change during the charging and discharging process, which would easily cause the coating layer to fall off or crack. In this embodiment, the interface film formed by complexing the compound represented by Structural formula 1 with metal element A has good affinity with the coating layer, thus improving the bonding strength between the interface film and the coating layer, which is beneficial to improving the stability of the coating layer and solving the problem of coating falling off.

In the embodiment of coating, a coating layer is provided outside the positive electrode active material, and the coating layer is selected from an oxide containing metal element A, and a weight of the coating layer is 1-10% of the total weight of the positive electrode active material.

In a preferred embodiment, the oxide containing metal element A includes one or more of aluminium oxide, magnesium oxide, titanium oxide, tungsten oxide, tin oxide, zinc oxide, zirconium oxide, molybdenum oxide and chromium oxide.

In a preferred embodiment, a lattice energy of the oxide containing metal element A is less than 4000 Kj/mol.

In some embodiments, the compound represented by Structural formula 1 is selected from one or more of the following compounds:

Compound 1

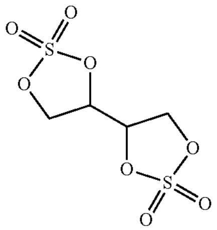

Compound 2

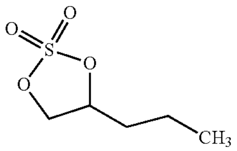

Compound 3

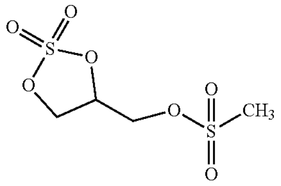

Compound 4

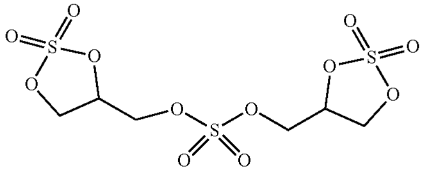

Compound 5

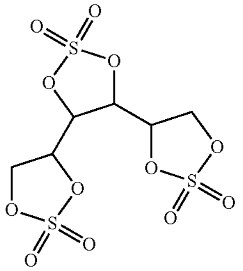

Compound 6

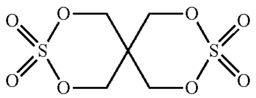

Compound 7

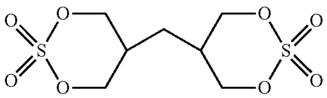

Compound 8

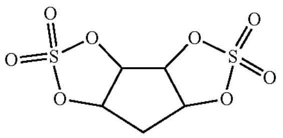

Compound 9

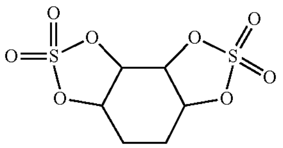

-continued

Compound 10

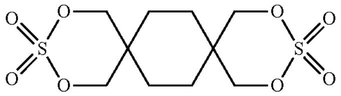

Compound 11

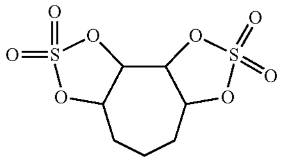

Compound 12

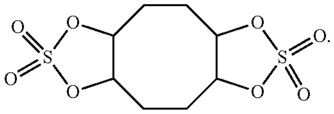

It should be noted that the above compounds are only preferred embodiments of the compounds represented by Structural formula 1 of the present application, and should not be understood as limitations of the present application.

In some embodiments, the percentage mass content of the compound represented by Structural formula 1 is 0.05%-5% based on the total mass of the non-aqueous electrolyte being 100%.

In a preferred embodiment, the percentage mass content of the compound represented by Structural formula 1 is 0.1%-3% based on the total mass of the non-aqueous electrolyte being 100%.

In some embodiments, the range of C is 0.01-0.2, preferably 0.01-0.1.

In some embodiments, the positive electrode material further includes a positive electrode binder, and the binder includes one or more of polyvinylidene fluoride (PVDF), polytetrafluoroethylene, polyethylene, styrene butadiene rubber, fluororubber, polyacrylic acid, polyvinylpyrrolidone and carboxymethyl cellulose.

In a preferred embodiment, the positive electrode binder includes polyvinylidene fluoride.

Compared with other positive electrode binders, the compound represented by Structural formula 1 and polyvinylidene fluoride have a better coordination function in improving the battery performance. It is speculated that the compound represented by Structural formula 1 can form a coupling structure with polyvinylidene fluoride to form an intermediate with good mechanical flexibility, which greatly enhances the bonding ability and flexibility of polyvinylidene fluoride, better maintains the integrity of the positive electrode active material, reduces the generation of particle cracks, further improves the structural stability of the positive electrode active material, and greatly improves the electrochemical performance of lithium-ion batteries during cycle and storage.

In some embodiments, the positive electrode material layer further includes a positive electrode conductive agent, and the conductive agent includes one or more of carbon black, acetylene black, conductive graphite, carbon nanotubes and graphene.

In some embodiments, the positive electrode further includes an positive electrode current collector, and the positive electrode material layer is coated on the surface of the positive electrode current collector.

Optionally, the solvent includes one or more of cyclic carbonate, linear carbonate, carboxylic ester and ether.

In some embodiments, the cyclic carbonate includes one or more of ethylene carbonate, vinylene carbonate, propylene carbonate and butylene carbonate.

The linear carbonate includes one or more of dimethyl carbonate, diethyl carbonate, ethyl methyl carbonate and methyl propyl carbonate.

The carboxylic ester includes one or more of methyl acetate, ethyl acetate, methyl propionate, ethyl propionate, methyl butyrate, methyl isobutyrate, methyl trimethylacetate and ethyl trimethylacetate.

The ether includes one or more of ethylene glycol dimethyl ether, 1,3-dioxolame and 1,1,2,2-tatrafluoroethyl-2,2,3,3-tetrafluoropropyl ether.

In a preferred embodiment, the organic solvent is a mixture of ethylene carbonate, diethyl carbonate and ethyl methyl carbonate.

In some embodiments, the electrolyte salt includes one or more of $LiPF_6$, $LiBF_4$, $LiPO_2F_2$, LiBOB, LIDFOB, $LiSbF_6$, $LiAsF_6$, $LiN(SO_2CF_3)_2$, $LiC(SO_2CF_3)_3$ and $LiN(SO_2F)_2$;

a content of the electrolyte salt is 0.5-3.5 mol/L in the non-aqueous electrolyte.

In a preferred embodiment, the electrolyte salt is selected from $LiPF_6$.

In a preferred embodiment, a content of the electrolyte salt is 0.7-1.5 mol/L in the non-aqueous electrolyte.

In some embodiments, the non-aqueous electrolyte further includes a supplemental additive, and the supplemental additive includes one or more of unsaturated cyclic carbonate, fluorinated cyclic carbonate, cyclic sultone and cyclic sulfate;

the percentage mass content of the supplemental additive is 0.1%-5% based on the total mass of the non-aqueous electrolyte being 100%.

In some embodiments, the unsaturated cyclic carbonate is selected from one or more of vinylene carbonate, vinylethylene carbonate and ethylene methylene carbonate.

The fluorinated cyclic carbonate is selected from one or more of fluoroethylene carbonate, trifluoromethyl vinylethylene carbonate and bisfluoroethylene carbonate.

The cyclic sultone is selected from one or more of 1,3-propane sultone, 1,4-butane sultone and propenyl-1,3-sultone.

the cyclic sulfate is selected from one or more of ethylene sulfate and 4-methyl ethylene sulfate.

In some embodiments, the negative electrode includes a negative electrode material layer, which includes a negative electrode active material. The negative electrode active material includes one or more of metallic lithium, graphite-like carbon material, hard carbon material, soft carbon material, silicon-based, tin-based, antimony-based, aluminum-based and transition metal compound.

In a preferred embodiment, the negative active electrode material is selected from graphite-like carbon material, and more preferably, the negative active electrode material is selected from artificial graphite.

In some embodiments, the negative electrode material layer further includes a negative electrode binder and a negative electrode conductive agent.

The negative electrode binder includes one or more of polyvinylidene fluoride (PVDF), polytetrafluoroethylene, polyethylene, styrene butadiene rubber, fluororubber, polyacrylic acid, polyvinylpyrrolidone and carboxymethyl cellulose.

The negative electrode conductive agent includes one or more of carbon black, acetylene black, conductive graphite, carbon nanotubes and graphene.

In some embodiments, the negative electrode further includes an negative electrode current collector, and the negative electrode material layer is coated on the surface of the negative electrode current collector.

In some embodiments, the lithium-ion battery further includes a separator. The separator includes one or more of polyolefin diaphragm, polyamide diaphragm, polysulfone diaphragm, polyphosphazene diaphragm, polyether sulfone diaphragm, polyether ether ketone diaphragm, polyether amide diaphragm and polyacrylonitrile diaphragm.

The present application will be further illustrated with embodiments.

Embodiment 1

This embodiment is used to illustrate the lithium-ion battery and its preparation method, including the following steps:

1) Preparation of Electrolyte

Ethylene carbonate (EC), diethyl carbonate (DEC) and ethyl methyl carbonate (EMC) were mixed according to the mass ratio of EC:DEC:EMC=1:1:1, and then lithium hexafluorophosphate ($LiPF_6$) was added until the molar concentration was 1 mol/L, and then each of the additives was added according to Table 1. The content of the additive is calculated as a percentage of the total mass of the electrolyte.

2) Preparation of Positive Plate

Positive electrode active material, conductive carbon black Super-P and positive electrode binder were mixed according to the mass ratio of 93:4:3, and then the mixture was dispersed in N-methyl-2-pyrrolidone (NMP) to obtain a positive electrode slurry. The use of positive electrode active material and positive electrode binder are shown in Table 1. The slurry was evenly coated on both sides of an aluminum foil, dried, calendered and vacuum-dried, and an aluminum lead wire was welded by an ultrasonic welding machine to obtain a positive electrode plate with a thickness of 120-150 μm.

3) Preparation of Negative Plate

Artificial graphite, conductive carbon black Super-P, binder styrene-butadiene rubber (SBR) and carboxymethyl cellulose (CMC) were mixed according to the mass ratio of 94:1:2.5:2.5, and then the mixture were dispersed in deionized water to obtain a negative electrode slurry. The slurry was coated on both sides of the copper foil, dried and calendered, and a nickel lead wire was welded by an ultrasonic welding machine to obtain a negative electrode plate with a thickness of 120-150 μm.

4) Preparation of Battery Core

A three-layer separator film with a thickness of 20 μm was placed between the positive electrode plate and the negative electrode plate. And then the sandwich structure composed of the positive electrode plate, negative electrode plate and separator was wound. Then the winding body was flattened and placed in an aluminum foil packaging bag and baked in vacuum at 75° C. for 48 hours to obtain a battery core to be injected with liquid.

5) Liquid Injection and Formation of Battery Core

In a glove box with water and oxygen contents below 20 ppm and 50 ppm respectively, the prepared electrolyte was injected into the battery core, vacuum-packaged, and left at 45° C. for 24 hours.

Then, follow the steps below to perform the first charge: charging at 0.05C constant current for 180 min, charging at 0.01C constant current for 180 min, charging at 0.2C constant current for 120 min, aging at 45° C. for 48 h, vacuum sealing twice, then further charging at 0.2C constant current to the cut-off voltage, and discharging at 0.2C constant current to 3.0V.

Embodiments 2-18

Embodiments 2-18 are used to illustrate the lithium-ion battery and its preparation method disclosed in the present application, including most of the steps in Embodiment 1, with the differences that:

In the preparation step of electrolyte:

Additives with percentage mass contents shown in Table 1 were used for Embodiments 2-18.

In the preparation step of positive electrode plate:

Positive electrode active materials and positive electrode binders shown in Table 1 were used for Embodiments 2-18.

Comparative Examples 1-4

Embodiments 1~4 are used to illustrate the lithium-ion battery and its preparation method disclosed in the present application, including most of the steps in Embodiment 1, with the differences that:

In the preparation step of electrolyte:

Additives with percentage mass contents shown in Table 1 were used for Comparative examples 1-4.

In the preparation step of positive electrode plate:

Positive electrode active materials and positive electrode binders shown in Table 1 were used for Comparative examples 1-4.

Performance Tests

The following performance tests were conducted on the lithium-ion batteries prepared in the above Embodiments 2-18 and Comparative examples 1-4.

(1) Measurement Method for Impedance at 25° C.

At normal temperature (25° C.), the battery was charged to 50% of the battery capacity at constant current and kept for 0.5 hour.

Charge the battery at 0.1C constant current for 10 s, discharge at 0.1C constant current for 40 s, and record the final voltage V1;

Charge the battery at 0.2C constant current for 10 s, discharge at 0.2C constant current for 40 s, and record the final voltage V2;

Charge the battery at 0.5C constant current for 10 s, discharge at 0.5C constant current for 40 s, and record the final voltage V3.

Make a straight line with current as abscissa and voltage as ordinate, and the slope of the straight line is the impedance at 25° C.

(2) High-Temperature Cycle Performance Test

The prepared lithium-ion battery was placed in an oven at constant temperature of 45° C., charged at 1C constant current to the charging cut-off voltage, then charged at a constant current and constant voltage until the current dropped to 0.05C, and then discharged at 1C constant current to 3.0V, repeated this cycle, and the first discharge capacity and the last discharge capacity were recorded.

Calculate the capacity retention rate of high-temperature cycle according to the following formula:

$$\text{Capacity retention rate}=\text{last discharge capacity}/\text{first discharge capacity}\times 100\%\ \%.$$

(3) High-Temperature Storage Performance Test

At room temperature, the formed lithium-ion battery was charged at 1C constant current to the charging cut-off voltage, then charged at a constant current and constant voltage until the current dropped to 0.05C, then discharged at 1C constant current to 3.0V, and the initial discharge capacity of the battery was measured. After being fully charged and stored at 60° C. for 30 days, it was discharged at 1C to 3V, and the retention capacity of the battery was measured. The calculation formula is as follows:

$$\text{Capacity Retention Rate (\%)}=\text{Retention Capacity}/\text{Initial Capacity}\times 100\%.$$

The obtained test results are shown in Table 1.

TABLE 1

| Group | Positive electrode active material | Positive electrode binder | Compound represented by Structural formula 1 and its content B(%) | Ratio C of the molar content of metal element A to the molar content of transition metal M in the positive electrode material layer per unit area | Value of F | Initial impedance at 25° C. (mΩ) | Capacity retention rate after 800 cycles at 45° C. (%) | Capacity retention rate after 30 days storage at 60° C. (%) |
|---|---|---|---|---|---|---|---|---|
| Embodiment 1 | $LiNi_{0.51}Co_{0.16}Mn_{0.24}Ti_{0.09}O_2$ | PVDF | Compound 1 0.5% | 0.1 | 5 | 19.4 | 87.5 | 89.8 |
| Embodiment 2 | $LiNi_{0.51}Co_{0.16}Mn_{0.24}Ti_{0.09}O_2$ | PVDF | Compound 1 1% | 0.1 | 10 | 22.1 | 91.2 | 91.6 |
| Embodiment 3 | $LiNi_{0.5}Co_{0.1}Mn_{0.1}Ti_{0.3}O_2$ | PVDF | Compound 1 3% | 0.43 | 6.97 | 30.6 | 91.4 | 90.9 |
| Embodiment 4 | $LiNi_{0.5}Co_{0.2}Mn_{0.22}Ti_{0.08}O_2$ | PVDF | Compound 1 5% | 0.087 | 57.47 | 38.7 | 90.8 | 92.3 |
| Embodiment 5 | $LiNi_{0.5}Co_{0.2}Mn_{0.26}Ti_{0.04}O_2$ | PVDF | Compound 1 5% | 0.0417 | 119.9 | 36.8 | 90.9 | 91.0 |
| Embodiment 6 | $LiNi_{0.5}Co_{0.2}Mn_{0.28}Ti_{0.02}O_2$ | PVDF | Compound 1 4% | 0.0204 | 196 | 34.3 | 89.6 | 90.4 |
| Embodiment 7 | $LiNi_{0.5}Co_{0.2}Mn_{0.29}Ti_{0.01}O_2$ | PVDF | Compound 1 4% | 0.0101 | 396 | 33.9 | 88.2 | 88.6 |
| Embodiment 8 | $LiNi_{0.5}Co_{0.19}Mn_{0.31}$ coated with MgO | PVDF | Compound 1 0.5% | 0.072 | 6.94 | 20.7 | 89.7 | 90.1 |
| Embodiment 9 | $LiNi_{0.5}Co_{0.19}Mn_{0.31}$ coated with MgO | PVDF | Compound 1 1% | 0.083 | 12.05 | 23.6 | 91.3 | 90.0 |
| Embodiment 10 | $LiNi_{0.5}Co_{0.19}Mn_{0.31}$ coated with MgO | PVDF | Compound 1 3% | 0.126 | 23.81 | 33.4 | 90.9 | 89.2 |
| Embodiment 11 | $LiNi_{0.5}Co_{0.19}Mn_{0.31}$ coated with MgO | PVDF | Compound 1 5% | 0.071 | 70.42 | 33.1 | 90.6 | 90.6 |
| Embodiment 12 | $LiNi_{0.5}Co_{0.19}Mn_{0.31}$ coated with MgO | PVDF | Compound 2 0.5% | 0.05 | 10 | 20.3 | 89.1 | 90.4 |
| Embodiment 13 | $LiNi_{0.5}Co_{0.19}Mn_{0.31}$ coated with MgO | PVDF | Compound 5 0.5% | 0.065 | 7.69 | 29.4 | 88.3 | 87.4 |
| Embodiment 14 | $LiNi_{0.5}Co_{0.19}Mn_{0.31}$ coated with MgO | PVDF | Compound 6 0.5% | 0.073 | 6.84 | 17.6 | 86.2 | 87.1 |
| Embodiment 15 | $LiNi_{0.5}Co_{0.19}Mn_{0.31}$ coated with MgO | PVDF | Compound 9 0.5% | 0.068 | 7.35 | 19.1 | 88.1 | 89.4 |
| Embodiment 16 | $LiNi_{0.5}Co_{0.19}Mn_{0.31}$ coated with MgO | Styrene butadiene rubber | Compound 1 0.5% | 0.072 | 6.94 | 23.7 | 84.7 | 85.2 |
| Embodiment 17 | $LiNi_{0.5}Co_{0.19}Mn_{0.31}$ coated with MgO | Carboxy methyl cellulose (CMC) | Compound 1 0.5% | 0.072 | 6.94 | 26.7 | 85.8 | 84.9 |
| Embodiment 18 | $LiNi_{0.5}Co_{0.19}Mn_{0.31}$ coated with MgO | Polyacrylic acid | Compound 1 0.5% | 0.072 | 6.94 | 21.6 | 83.4 | 85.1 |
| Comparative example 1 | $LiNi_{0.5}Co_{0.25}Mn_{0.25}O_2$ | PVDF | Compound 1 1% | — | 0 | 16.4 | 77.3 | 65.8 |
| Comparative example 2 | $LiNi_{0.5}Co_{0.2}Mn_{0.29}Ti_{0.01}O_2$ | PVDF | Compound 1 5.5% | 0.0101 | 544.6 | 43.8 | 62.9 | 69.4 |
| Comparative example 3 | $LiNi_{0.5}Co_{0.25}Mn_{0.25}$ coated with MgO | PVDF | Compound 1 5% | 0.009 | 555.6 | 40.2 | 75.1 | 80.1 |
| Comparative example 4 | $LiNi_{0.5}Co_{0.25}Mn_{0.25}$ coated with MgO | PVDF | Compound 2 5% | 0.009 | 555.6 | 39.6 | 70.6 | 72.3 |

By comparing the test data of Embodiments 1-18 and Comparative examples 1-4, it can be seen that the combination of positive electrode active material and electrolyte additive provided by the present application, especially under the condition that value F being limited within the indicated range, could effectively improve the high-temperature cycle performance and high-temperature storage performance of the battery, meanwhile, the impedance could be maintained at a low level, indicating that the compound represented by Structural formula 1 and positive electrode active material doped with or coated with metal element A could form a stable interface film layer on the surface of the positive electrode material layer at a specific ratio, which is beneficial to inhibiting the dissolution of metal ions and improving the high temperature performance of the battery.

By comparing the test results of Comparative examples 1-11, it can be seen that although the value F in the range of $0.25 \leq F \leq 500$ could generally improve the high-temperature storage and high-temperature cycle performance of lithium-ion batteries, but the extent of performance improvement is different. When the value F is in the range of $5 \leq F \leq 80$, the battery performance could be improved to the greatest extent, and the battery is in a state of excellent comprehensive performance.

Comparing the test results of Comparative example 8 and Embodiments 12-15, it can be seen that different compounds represented by Structural formula 1 have great performance improvement effects on lithium-ion batteries under the condition that value F is defined by the present application.

Comparing the test results of Comparative example 8 and Embodiments 16-18, it can be seen that the compound represented by Structural formula 1 has a good coordination effect with the specific binder polyvinylidene fluoride (PVDF), indicating that the compound represented by Structural formula 1 could form a coupling structure with polyvinylidene fluoride, and the formed intermediate has better mechanical flexibility, which is beneficial to maintaining the stability of the positive electrode active material.

The above are only preferred embodiments of the present application, and not intended to limit the present application. Any modifications, equivalent substitutions and improvements made within the spirit and principle of the present application shall be included in the scope of protection of the present application. Further, the singular terms "a", "an" and "the" include plural reference and vice versa unless the context clearly indicates otherwise.

The invention claimed is:

1. A lithium-ion battery, comprising a positive electrode, a negative electrode and a non-aqueous electrolyte, wherein the positive electrode comprises a positive electrode material layer, the positive electrode material layer comprises a positive electrode active material, and the positive electrode active material comprises $LiMO_2$, where M is selected from one or more of Ni, Co and Mn, and the positive electrode active material is coated with a compound containing metal element A, the metal element A is selected from one or more of Al, Mg, Cr, Pb, Ti, Ba, Cu, Fe, Sr, Y, Zr, Zn, Cd, Ru, V, Mo, Ta, W, Nb and Sn;

the non-aqueous electrolyte comprises a solvent, an electrolyte salt and a compound represented by Structural formula 1:

Structural formula 1

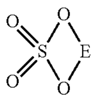

wherein E is selected from

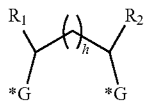

or

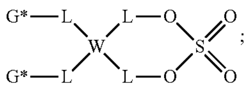

;

Structural formula 2

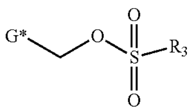

Structural formula 3

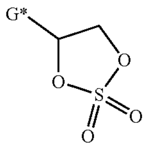

Structural formula 4

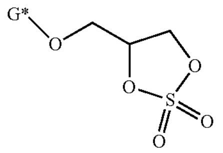

where G* represents a bonding position;

h is 0 or 1;

R1 is selected from a hydrogen atom, an alkyl group with 1-6 carbon atoms, a group represented by Structural formula 2 or a group represented by Structural formula 3;

R2 is selected from a group represented by Structural formula 3 or a group represented by Structural formula 2;

R3 is selected from a group represented by Structural formula 4;

L is selected from a single bond or methylene, and W is selected from

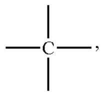

,

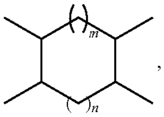

,

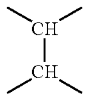

and

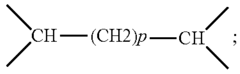

;

where m is an integer from 1 to 4, n is an integer from 0 to 2, and p is an integer from 0 to 6;

based on the total mass of the non-aqueous electrolyte being 100%, a percentage mass content of the compound represented by Structural formula 1 is B %; a ratio of a molar content of metal element A to a molar content of transition metal M in the positive electrode material layer per unit area is C, and F=B/C, which satisfies the following relationship:

$0.25 \leq F \leq 500$, $0.05\% \leq B\ \% \leq 5\%$, and $0.01 \leq C \leq 0.2$.

2. The lithium-ion battery of claim 1, wherein value F satisfies the following relationship:

$$1 \leq F \leq 200.$$

3. The lithium-ion battery of claim 1, wherein a coating layer is provided outside the positive electrode active material, and the coating layer is selected from an oxide containing metal element A, and a weight of the coating layer is 1-10% of the total weight of the positive electrode active material.

4. The lithium-ion battery of claim 3, wherein the oxide containing metal element A comprises one or more of aluminium oxide, magnesium oxide, titanium oxide, tungsten oxide, tin oxide, zinc oxide, zirconium oxide, molybdenum oxide and chromium oxide.

5. The lithium-ion battery of claim 1, wherein the compound represented by Structural formula 1 is selected from one or more of the following compounds:

Compound 1

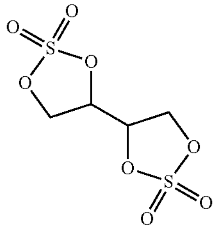

-continued

Compound 4

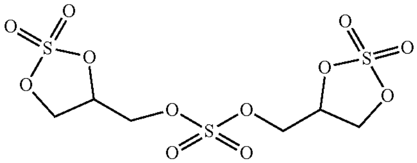

Compound 5

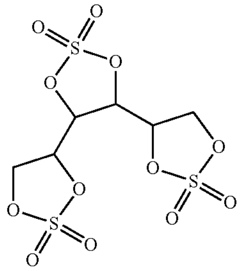

Compound 6

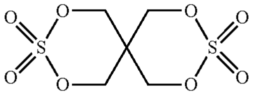

Compound 7

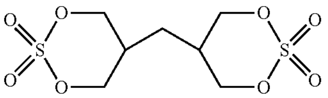

Compound 8

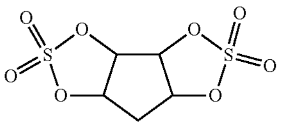

Compound 9

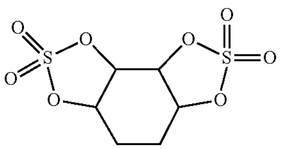

Compound 10

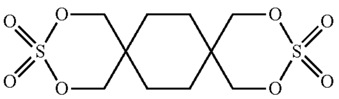

Compound 11

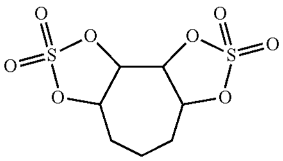

-continued

Compound 12

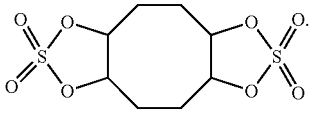

6. The lithium-ion battery of claim 1, wherein the positive electrode material layer further comprises a positive electrode binder, and the positive electrode binder comprises polyvinylidene fluoride.

7. The lithium-ion battery of claim 1, wherein the solvent comprises one or more of cyclic carbonate, linear carbonate, carboxylic ester and ether.

8. The lithium-ion battery of claim 1, wherein the non-aqueous electrolyte further comprises a supplemental additive, and the supplemental additive comprises one or more of unsaturated cyclic carbonate, fluorinated cyclic carbonate, cyclic sultone and cyclic sulfate.

9. The lithium-ion battery of claim 2, wherein value F satisfies the following relationship:

$$5 \leq F \leq 80.$$

10. The lithium-ion battery of claim 4, wherein a lattice energy of the oxide containing metal element A is less than 4000 Kj/mol.

11. The lithium-ion battery of claim 1, wherein the percentage mass content of the compound represented by Structural formula 1 is 0.1-3% based on the total mass of the non-aqueous electrolyte being 100%;

a range of C is 0.01-0.1.

12. The lithium-ion battery of claim 1, wherein the electrolyte salt comprises one or more of LiPF6, LiBF4, LiPO2F2, LiBOB, LIDFOB, LiSbF6, LiAsF6, LiN(SO2CF3)2, LiC(SO2CF3)3 and LiN(SO2F)2; and a content of the electrolyte salt is 0.5-3.5 mol/L in the non-aqueous electrolyte.

13. The lithium-ion battery of claim 8, wherein the percentage mass content of the supplemental additive is 0.1%-5% based on the total mass of the non-aqueous electrolyte being 100%.

14. The lithium-ion battery of claim 8, wherein the fluorinated cyclic carbonate is selected from one or more of fluoroethylene carbonate, trifluoromethyl vinylethylene carbonate and bisfluoroethylene carbonate;

the cyclic sultone is selected from one or more of 1,3-propane sultone, 1,4-butane sultone and propenyl-1,3-sultone; and the cyclic sulfate is selected from one or more of ethylene sulfate and 4-methyl ethylene sulfate.

* * * * *